United States Patent
Shin et al.

[11] Patent Number: 5,920,157
[45] Date of Patent: Jul. 6, 1999

[54] CIRCUIT AND METHOD FOR COMPENSATING FOR FLUCTUATIONS IN HIGH VOLTAGE OF FLY BACK TRANSFORMER FOR SEMIWIDE-SCREEN TELEVISION RECEIVER

[75] Inventors: Kil-Ho Shin; Ye-Mok Yang, both of Suwon, Rep. of Korea

[73] Assignee: Samsung Electronics Co., Ltd., Kyungki-do, Rep. of Korea

[21] Appl. No.: 08/961,129

[22] Filed: Oct. 30, 1997

[30] Foreign Application Priority Data

Nov. 27, 1996 [KR] Rep. of Korea ............... 96-58561
Nov. 28, 1996 [KR] Rep. of Korea ............... 96-58904

[51] Int. Cl.$^6$ ............... H04N 3/223; H04N 3/185; H04N 3/23
[52] U.S. Cl. ............... 315/389; 315/370; 315/371; 315/411
[58] Field of Search ............... 315/370, 371, 315/383, 387, 395, 403, 411; 348/806

[56] References Cited

U.S. PATENT DOCUMENTS

| | | | |
|---|---|---|---|
| 3,668,463 | 6/1972 | Smith et al. | 315/370 |
| 3,721,858 | 3/1973 | Shimizu | 315/383 |
| 3,959,689 | 5/1976 | Ikoma | 315/370 |
| 4,184,104 | 1/1980 | Shouse, Jr. | 315/371 |
| 4,645,984 | 2/1987 | Sutherland, II et al. | 315/371 |
| 4,827,194 | 5/1989 | Fernsler | 315/371 |
| 4,956,587 | 9/1990 | Kitou et al. | 315/408 |
| 5,357,175 | 10/1994 | Kamada et al. | 315/411 |
| 5,463,290 | 10/1995 | Fitzgerald | 315/411 |

FOREIGN PATENT DOCUMENTS

| | | |
|---|---|---|
| 0384293 | 8/1990 | European Pat. Off. |
| 2019174 | 10/1979 | United Kingdom |
| 2063630 | 6/1981 | United Kingdom |
| 2193407 | 2/1988 | United Kingdom |
| 9003079 | 3/1990 | WIPO |

OTHER PUBLICATIONS

International Search Report of GB 9724257.2, Feb. 16, 1998.

Primary Examiner—Edward P. Westin
Assistant Examiner—Shane R Gardner
Attorney, Agent, or Firm—Dilworth & Barrese

[57] ABSTRACT

A picture stabilizing circuit for a semiwide-screen television receiver capable of preventing vertical lines of the picture from being bent by detecting and compensating for a high-voltage variation caused by a picture brightness variation. In a picture stabilizing circuit for a semiwide-screen television receiver including a high voltage circuit for providing a high voltage induced in a secondary winding of a flyback transformer to an anode of a cathode ray tube, and a horizontal output device for controlling a deflection current using a voltage applied to a primary winding of the flyback transformer as its supply voltage and compensating for the deflection current in accordance with an east/west (E/W) signal, the picture stabilizing circuit comprising: a detecting device for detecting variation of the high voltage in the secondary winding of the flyback transformer and for outputting a signal corresponding to the variation of the high voltage; and an adder for adding the output signal of the detecting device to the E/W signal.

3 Claims, 6 Drawing Sheets

AFTER COMPENSATION

BEFORE COMPENSATION

CIRCUIT AND METHOD FOR COMPENSATING FOR FLUCTUATIONS IN HIGH VOLTAGE OF FLY BACK TRANSFORMER FOR SEMIWIDE-SCREEN TELEVISION RECEIVER

BACKGROUND OF THE INVENTION

1. Field of the Invention

The present invention relates to a television receiver and more particularly, to a picture stabilizing circuit for a semiwide-screen television receiver which can compensate for bending of vertical lines at the right and left corners of a display screen due to a partially extended horizontal amplitude caused by a high-voltage variation corresponding to a picture brightness variation.

2. Description of the Related Art

A semiwide-screen television receiver has an enlarged horizontal picture size with a 12.8×9 aspect ratio (AR), i.e. the ratio of width to height, in comparison to that of the existing 4×3 AR standard television receiver. The semiwide-screen television receiver can display horizontal information pertaining to a 12×9 AR television broadcasting signal at its maximum AR by minimizing the overscanning rate in the horizontal direction. To achieve this, a technique for stabilizing the edge portions of the picture is required since the overscanning rate of the television receiver in the horizontal direction should be reduced from approximately 9.3% for the standard television receiver, to approximately 3.2% for the semiwide-screen television receiver.

FIG. 1 is a schematic circuit diagram of a conventional television receiver. Referring to FIG. 1, a video processing section 10 receives a luminance (Y) signal and a chrominance (C) signal, and outputs the luminance signal and red (R), green (G), and blue (B) color signals to a cathode ray tube (CRT) driving section 12 which drives a CRT 14 to display a picture on the CRT 14. The video processing section 10 outputs a horizontal sync signal HD to a horizontal driving section 16 which drives a horizontal output section 18 to control the horizontal scanning on the screen through a horizontal deflection coil DC. A horizontal deflecting force is compensated for by an east/west (E/W) compensation signal which is obtained by amplifying an E/W signal provided from video processing section 10.

Meanwhile, a high-voltage circuit section 22 supplies a high voltage HV induced in a secondary winding of a flyback transformer FB to an anode of CRT 14 through a diode D.

According to the conventional television receiver as constructed above, if a relatively wide range of the picture is bright, the horizontal amplitude thereof becomes extended, causing the vertical lines of the picture to be bent as shown in FIG. 2. This is because the straight force of an electron beam becomes weakened in the bright region of the picture. If the straight force is weakened, the deflecting force is correspondingly strengthened, causing the trace of the electron beam to be angled outside by a degree θ as shown in FIG. 3. As a result, the deflecting force should be lowered corresponding to the high voltage variation in order to secure picture linearity in the bright region.

The video processing section 10 receives from the high-voltage circuit section 22 an auto brightness limit (ABL) signal which is obtained by detecting the voltage signal of the secondary winding of the flyback transformer FB. The video processing section 10 compensates for the picture size in accordance with the ABL signal. However, such an ABL type compensation circuit has difficulty in providing a rapid response due to its time delay characteristic. Also, while compensation for one horizontal period can be achieved, it is difficult to achieve compensation for one vertical period.

As mentioned, it is to be appreciated that in a standard television receiver having a horizontal overscanning rate of 9.3%, a distorted picture, due to an unstable high voltage caused by the variation of the picture brightness is typically not displayed on the edge portions of the screen. However, in a semiwide-screen television receiver having a horizontal overscanning rate of 3.2%, the right and left edge portions of the picture may be distorted due to the high-voltage variation caused by the picture-brightness variation, thereby deteriorating picture quality.

SUMMARY OF THE INVENTION

It is an object of the present invention to provide a picture stabilizing circuit for a semiwide-screen television receiver which can prevent the bending of the vertical lines of the picture by detecting and compensating for the high-voltage variation caused by the picture brightness variation.

To achieve the above object, there is provided a picture stabilizing circuit for a semiwide-screen television receiver including a high voltage circuit section for providing a high voltage induced in a secondary winding of a flyback transformer to an anode of a cathode ray tube, and a horizontal output section for controlling a deflection current using a voltage applied to a primary winding of the flyback transformer as its supply voltage and compensating for the deflection current in accordance with an east/west (E/W) signal, the picture stabilizing circuit comprising a detecting section for detecting variations in the high voltage induced in the secondary winding of the flyback transformer, and an adder section for adding a signal detected by the detecting section to the E/W signal.

These and other objects, features, and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
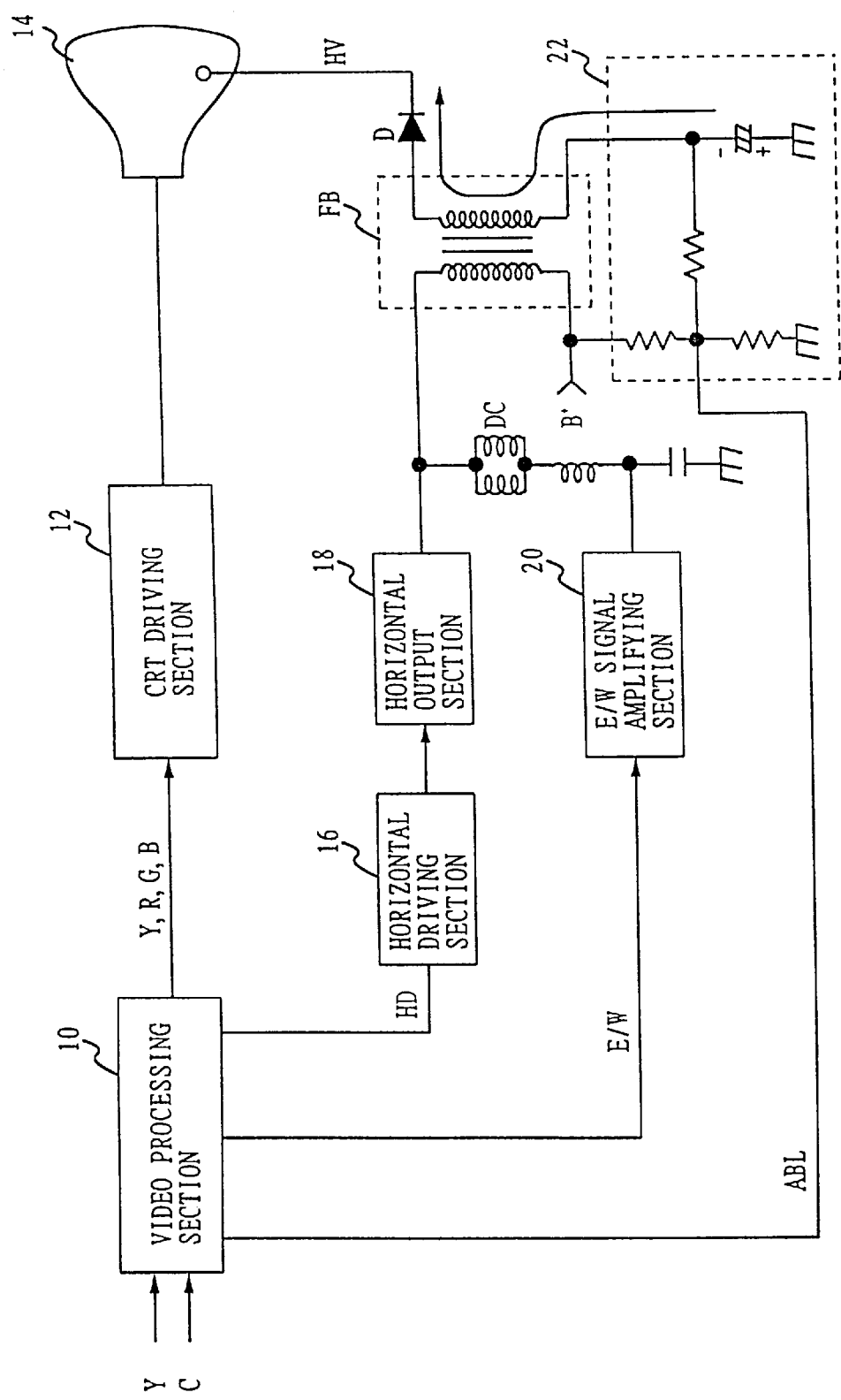
FIG. 1 is a schematic circuit diagram of a conventional television receiver.
Figure 3:
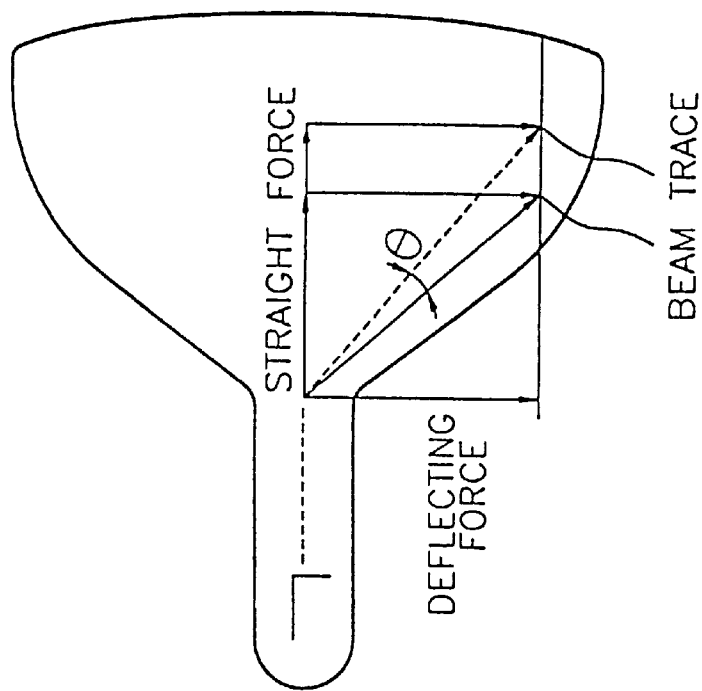
FIG. 3 is a diagram illustrating bending of the vertical lines.

Illustrative embodiments of the present invention will now be described with reference to the accompanying drawings. The same numerals or symbols are used for the same elements or parts in the drawings.

Figure 4:
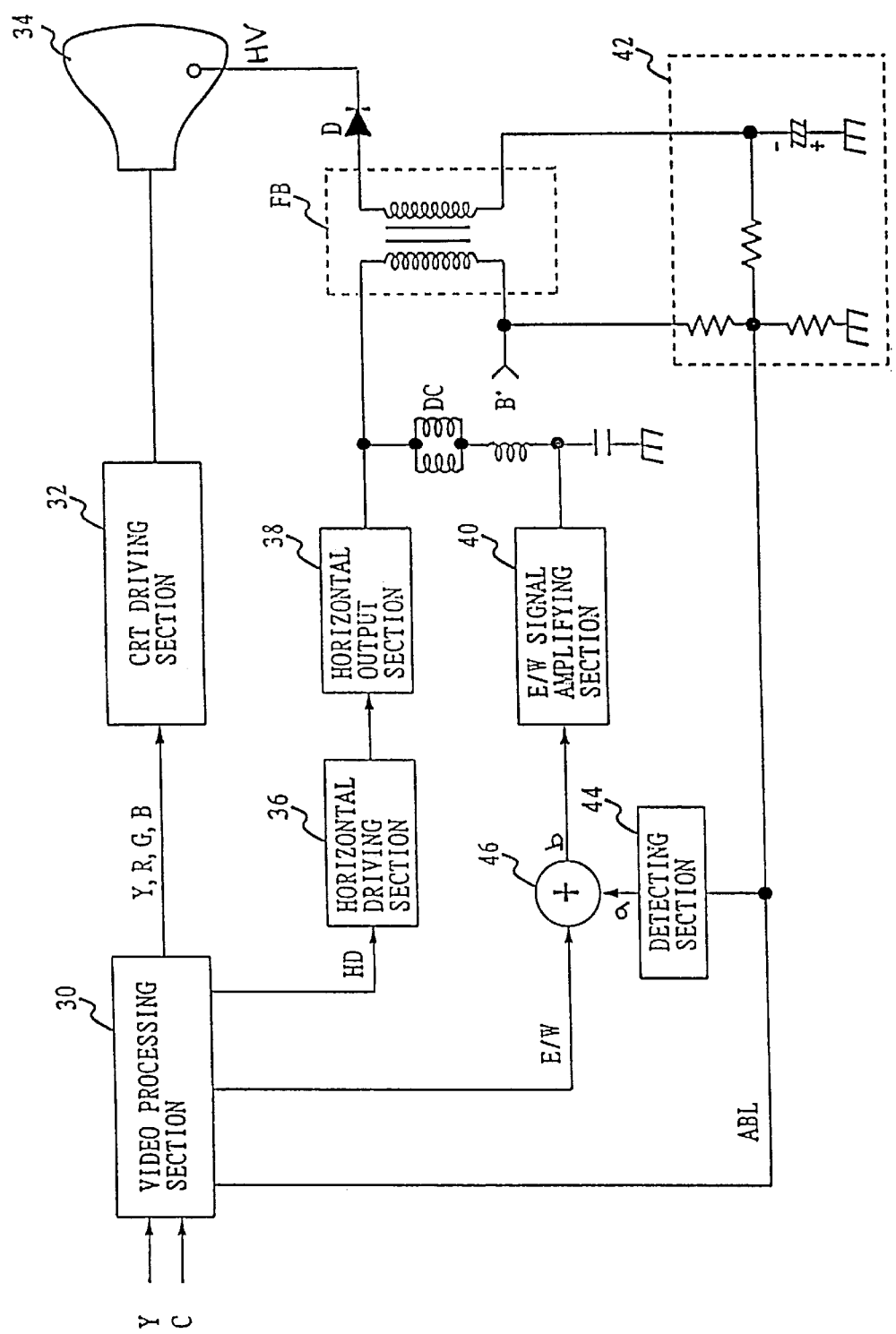
FIG. 4 is a schematic circuit diagram of a semiwide-screen television receiver according to one embodiment of the invention.

FIG. 4 is a schematic circuit diagram of the semiwide-screen television receiver according to one embodiment of the present invention. Referring to FIG. 4, a video processing section 30 receives a luminance signal Y and a chrominance signal C, and outputs the luminance signal Y and R, G, and B color signals to a CRT driving section 32 which drives a CRT 34 to display a picture on the CRT 34.

The video processing section 30 outputs a horizontal sync signal HD to a horizontal driving section 36 which drives a horizontal output section 38 to control the horizontal scanning on the screen through a horizontal deflection coil DC. The horizontal deflecting force is compensated for by an E/W compensation signal which is obtained, by amplifying through an E/W signal amplifying section 40, an E/W signal provided from the video processing section 30.

A high-voltage circuit section 42 supplies a high voltage HV induced in a secondary winding of a flyback transformer FB to an anode of the CRT 34 through a diode D. The high-voltage circuit section 42 detects the variation of the high voltage current, and provides an ABL signal to the video processing section 30.

The ABL signal is then supplied to a detecting section 44 to be integrated. The integrated signal outputted from the detecting section 44 is supplied to an adder 46 which adds the integrated signal to the E/W signal. The added signal from the adder 46 is supplied to the E/W signal amplifying section 40.

Figure 2:
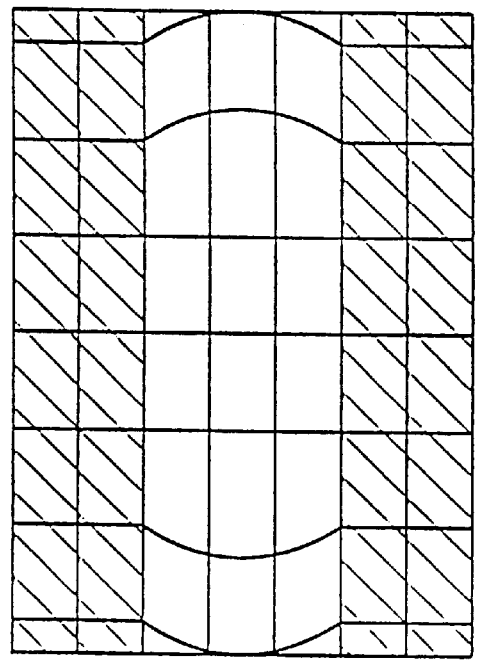
FIG. 2 is a diagram illustrating bending of the vertical lines of the picture due to the high voltage variation caused by the picture brightness variation in a television receiver.
Figure 5:
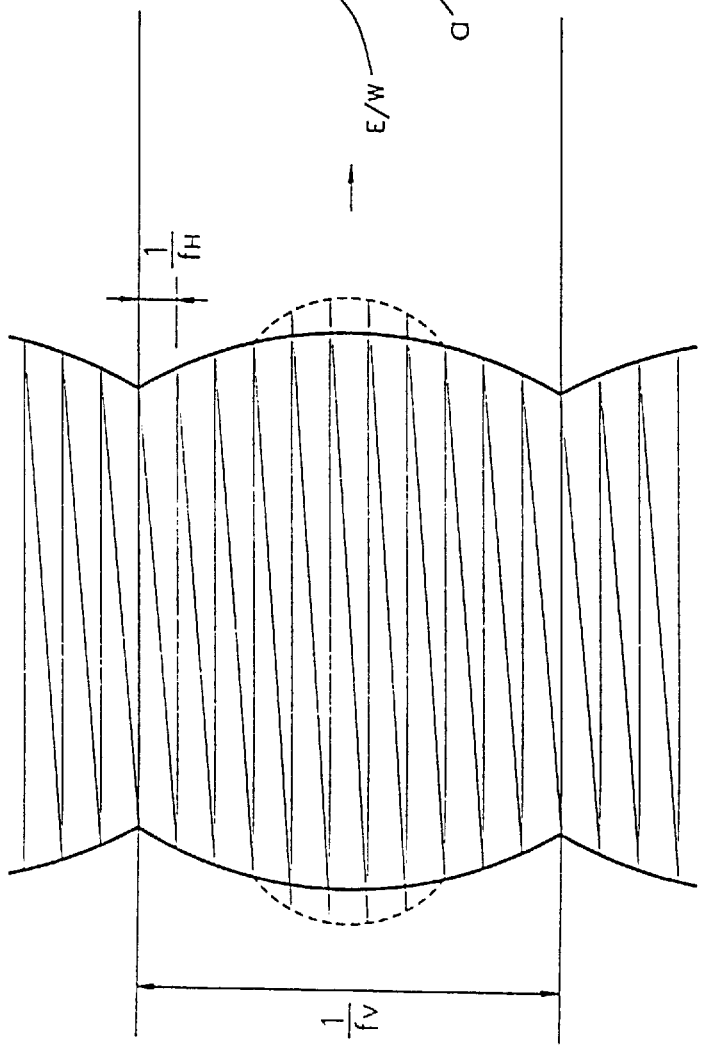
FIG. 5 is a diagram illustrating the horizontal scanning signal waveform before being compensated.

Accordingly, the size of the horizontal deflection current, as shown in FIG. 5, is varied corresponding to the amplitude of the E/W parabolic signal, in order to maintain the horizontal deflection current within a predetermined envelope. However, as shown in FIG. 5, the size of the horizontal deflection current is extended over the E/W parabolic wave (the extension beyond the parabolic wave is represented by the dotted line in FIG. 5, $1/f_v$ represents the period of the E/W parabolic signal, and $1/f_H$ represents the period of the horizontal deflection current) in the range corresponding to the bright portions of the picture in FIG. 2, causing the vertical lines of the right and left edge portions of the picture to be bent.

Figure 6:
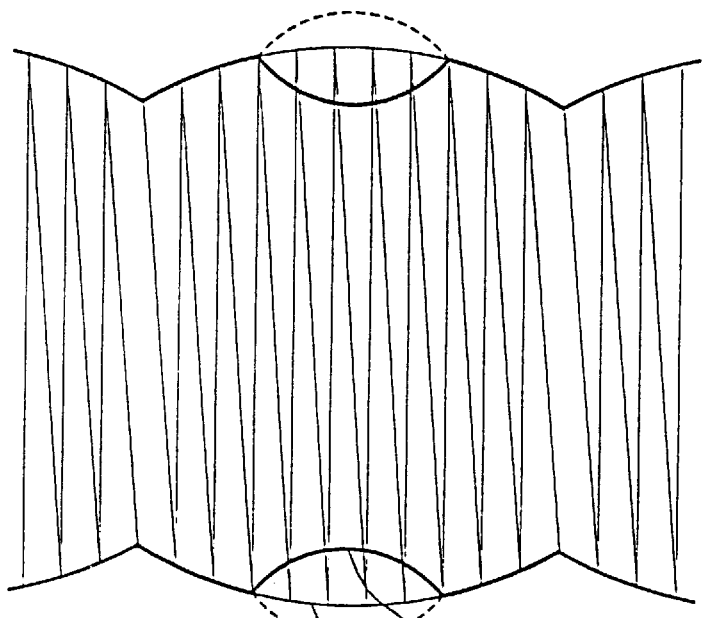
FIG. 6 is a diagram illustrating the horizontal scanning signal waveform after being compensated.

According to the present invention, the detecting section 44 integrates the ABL signal and outputs the integrated signal "a", as shown in FIG. 6, so that the deflecting force is lowered corresponding to the bright portion of the picture. The adder 46 adds the integrated signal "a" to the E/W signal to provide the E/W compensation signal "b" of the horizontal deflection current to the horizontal deflection coil DC connected to the horizontal output section 38. Accordingly, compensation is performed by preventing the horizontal amplitude from being extended due to the high voltage variation corresponding to the bright portion of the picture; thus, picture distortion resulting from the bending of the vertical lines on the screen is advantageously prevented.

Figure 7:
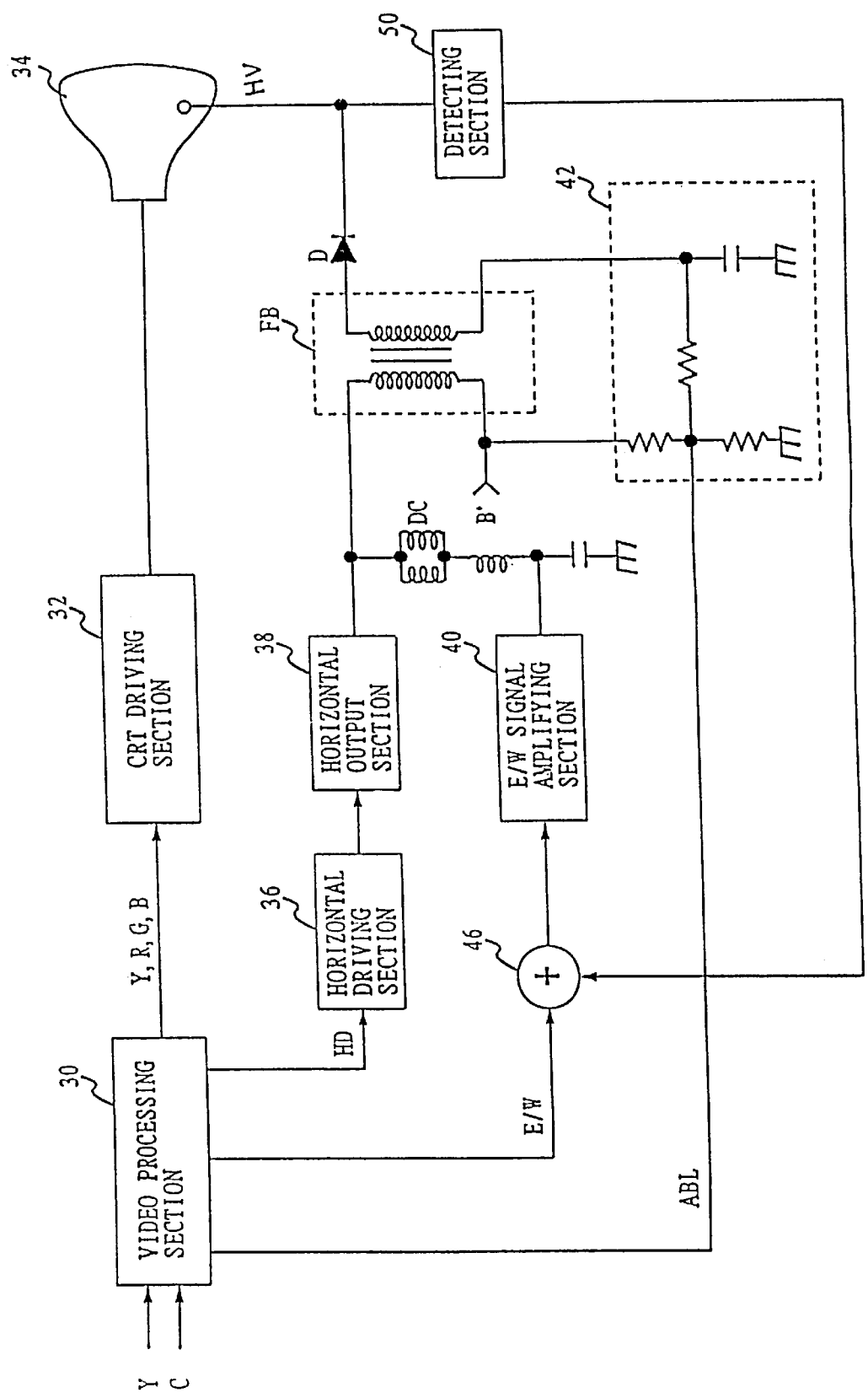
FIG. 7 is a schematic circuit diagram of the semiwide-screen television receiver according to another embodiment of the invention; and, FIG. 8 is a schematic circuit diagram of the detecting section of FIG. 7.

FIG. 7 is a schematic circuit diagram of the picture stabilizing circuit for a semiwide-screen television receiver according to another embodiment of the present invention. In FIG. 7, the same numerals or symbols denote the same elements or parts as in FIG. 4, and thus the detailed explanation thereof will be omitted. In this embodiment, a detecting section 50 detects the high voltage current supplied to the anode of the CRT 34 and provides the detected signal to the adder 46.

Figure 8:
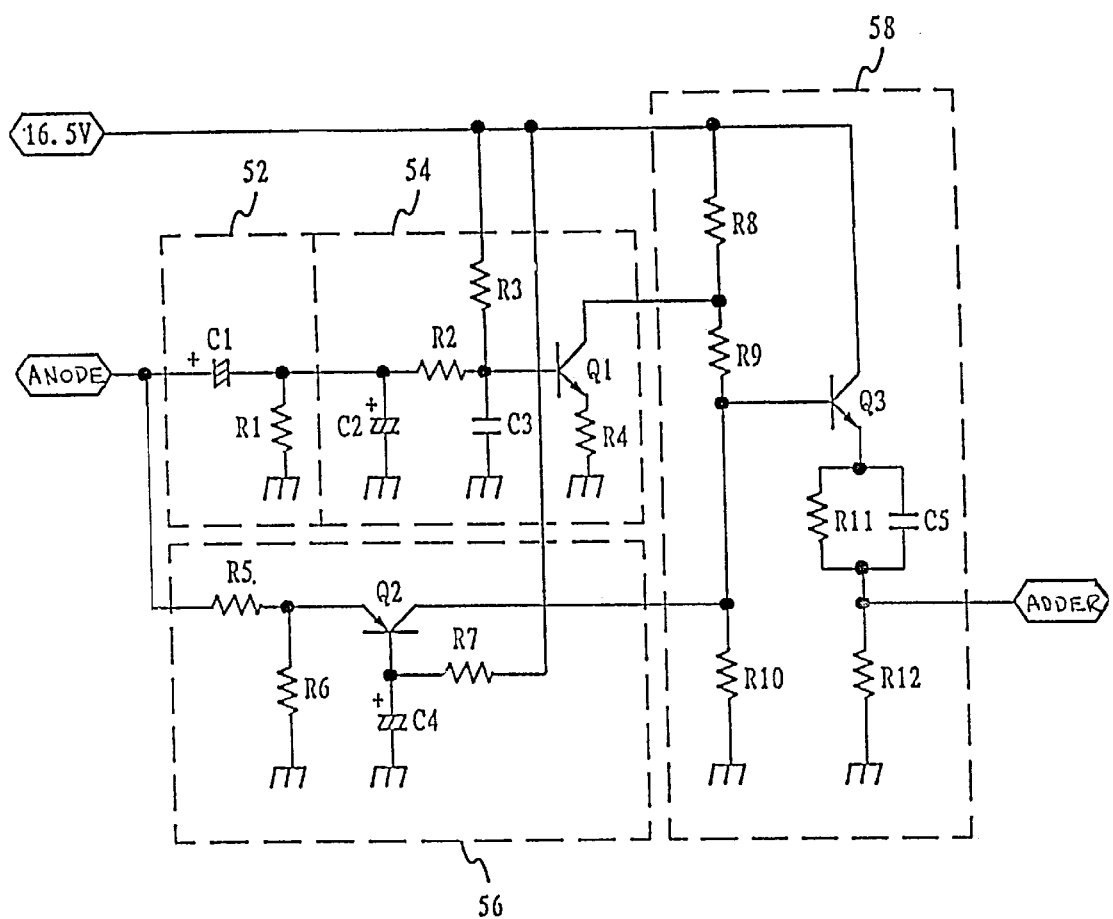

FIG. 8 is a schematic circuit diagram of the detecting section 50 according to the embodiment of FIG. 7. The detecting section 50 includes: a detector part 52 connected to the anode of the CRT 34 for detecting the high voltage variation generated from the secondary winding of the flyback transformer FB; an inversion-amplifying part 54 connected to detector part 52, for inverting and amplifying the detected high voltage variation signal; an input buffering part 56 connected to the flyback transformer, for buffering a DC component of the high voltage generated from the secondary winding of the flyback transformer FB; and an output level adjusting part 58 connected to the input buffering part 56 and the inversion amplifying part 54, for adding the DC component of the high voltage buffered through the input buffering part 56 and the variation signal inverted and amplified through the inversion amplifying part 54, and for adjusting the DC level of the added signal to provide the adjusted signal to the adder 46.

The detecting part 52 includes circuitry for detecting the high-voltage variation by differentiating the high voltage provided from the secondary winding of the flyback transformer. The circuitry for the detecting part 52 preferably includes a differentiation circuit composed of a capacitor C1 and a resistor R1. In detecting the high-voltage variation which corresponds to the slope of the input signal waveform, the circuit constant is determined in a manner that the differential time constant is sufficiently small in comparison to the minimum slope of the signal waveform, and thus successfully follows the slope of the input signal.

The inversion-amplifying part 54 includes circuitry for inverting and amplifying the differentiated waveform detected by the detecting part 52. The circuitry for the inversion-amplifying part 54 preferably includes a transistor Q1, resistors R2 to R4, and capacitors C2 and C3.

The input buffering part 56 includes circuitry for lowering the high voltage provided from the secondary winding of the flyback transformer to a predetermined level. The circuitry for the input buffering part 56 preferably includes a transistor Q2, resistors R5 to R7, and a capacitor C4.

The output level adjusting part 58 includes circuitry for adding the output of the inversion-amplifying part 54 to the output of the input buffering part 56. The output level adjusting part 58 then lowers the added signal to a predetermined level to provide the lowered signal to the adder 46. The lowered signal is added to the E/W signal in adder 46 to effect compensation as explained above. The circuitry for the output level adjusting part preferably includes a transistor Q3, resistors R8 to R12, and a capacitor C5.

Thus, according to the present invention, horizontal amplitude variation can be compensated for by detecting the high-voltage variation and by producing a compensation signal which is opposite to the high-voltage variation, thereby preventing the bending of the vertical lines and stabilizing the picture displayed on the screen.

While the present invention has been described and illustrated herein with reference to the illustrative embodiments thereof, it will be understood by those skilled in the art that various changes in form and details may be made therein without departing from the spirit and scope of the invention.

What is claimed is:

1. A picture stabilizing circuit for a semiwide-screen television receiver including a high voltage circuit for providing a high voltage induced in a secondary winding of a flyback transformer to an anode of a cathode ray tube, and a horizontal output means for controlling a deflection current using a voltage applied to a primary winding of said flyback transformer as its supply voltage and compensating for said deflection current in accordance with an east/west (E/W) signal, said picture stabilizing circuit comprising:

detecting means for detecting variation of said high voltage in said secondary winding of said flyback transformer and for outputting a signal corresponding to the variation of said high voltage; and an adder for adding the output signal of said detecting means to said E/W signal, wherein said detecting means includes:

a detector part connected to said anode, for detecting said variation of a high voltage current supplied to said anode;

an inversion-amplifying part connected to said detector part, for inverting and amplifying said detected variation of said high voltage current supplied to said anode;

an input buffering part connected to said anode, for buffering a DC component of said high voltage current supplied to said anode; and an output level adjusting part connected to said input buffering part and said inversion-amplifying part, for adding said DC component of said high voltage buffered though said input buffering part and said variation signal inverted through said inversion-amplifying part, and adjusting a DC level of an added signal to provide an adjusted signal to said adder.

2. A picture stabilizing circuit as claimed in claim 1, wherein said detecting means detects said variation of said high voltage by receiving and processing an auto brightness limit (ABL) signal.

3. A picture stabilizing circuit as claimed in claim 1, wherein said detector part comprises a differentiator including a resistor and a capacitor.

* * * * *